Jan. 1, 1957  W. H. WENTLING  2,776,088
BLOWERS
Filed Feb. 9, 1956  2 Sheets-Sheet 1
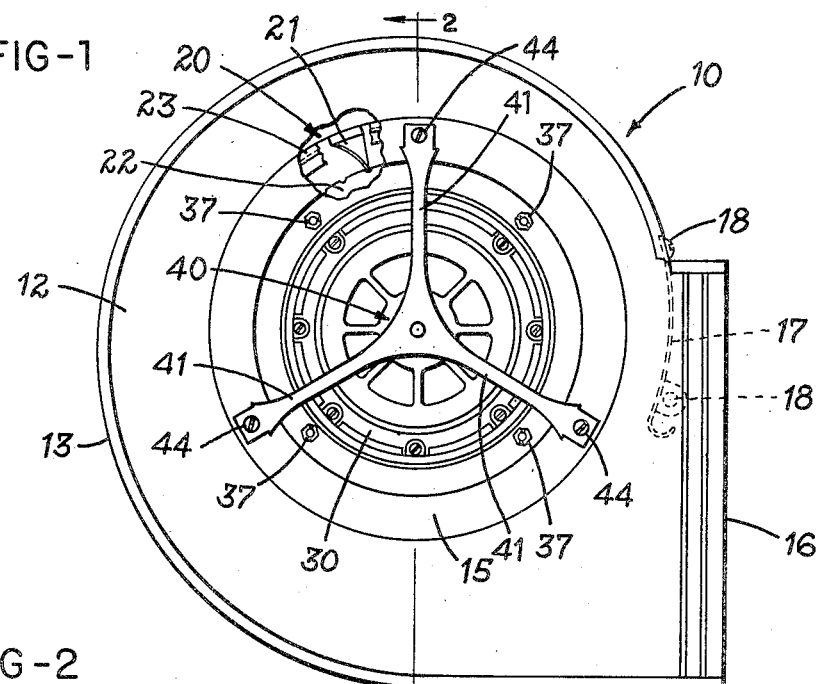
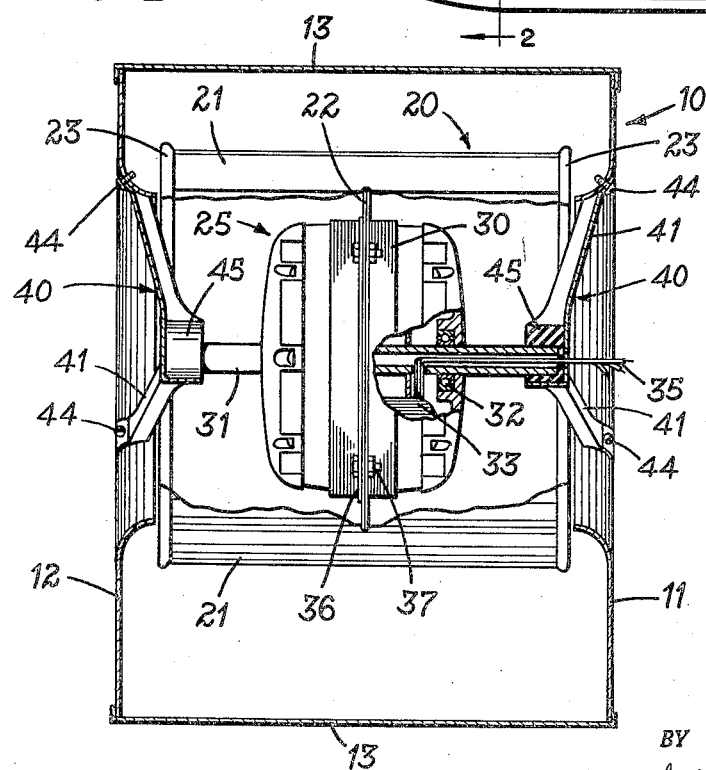
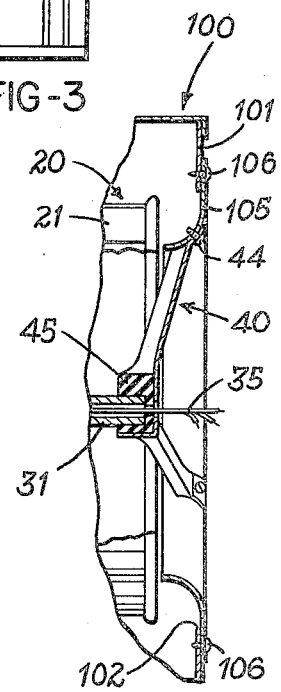
INVENTOR.
WILLIAM H. WENTLING
BY
Mareschal, Biebel, French & Bugg
ATTORNEYS

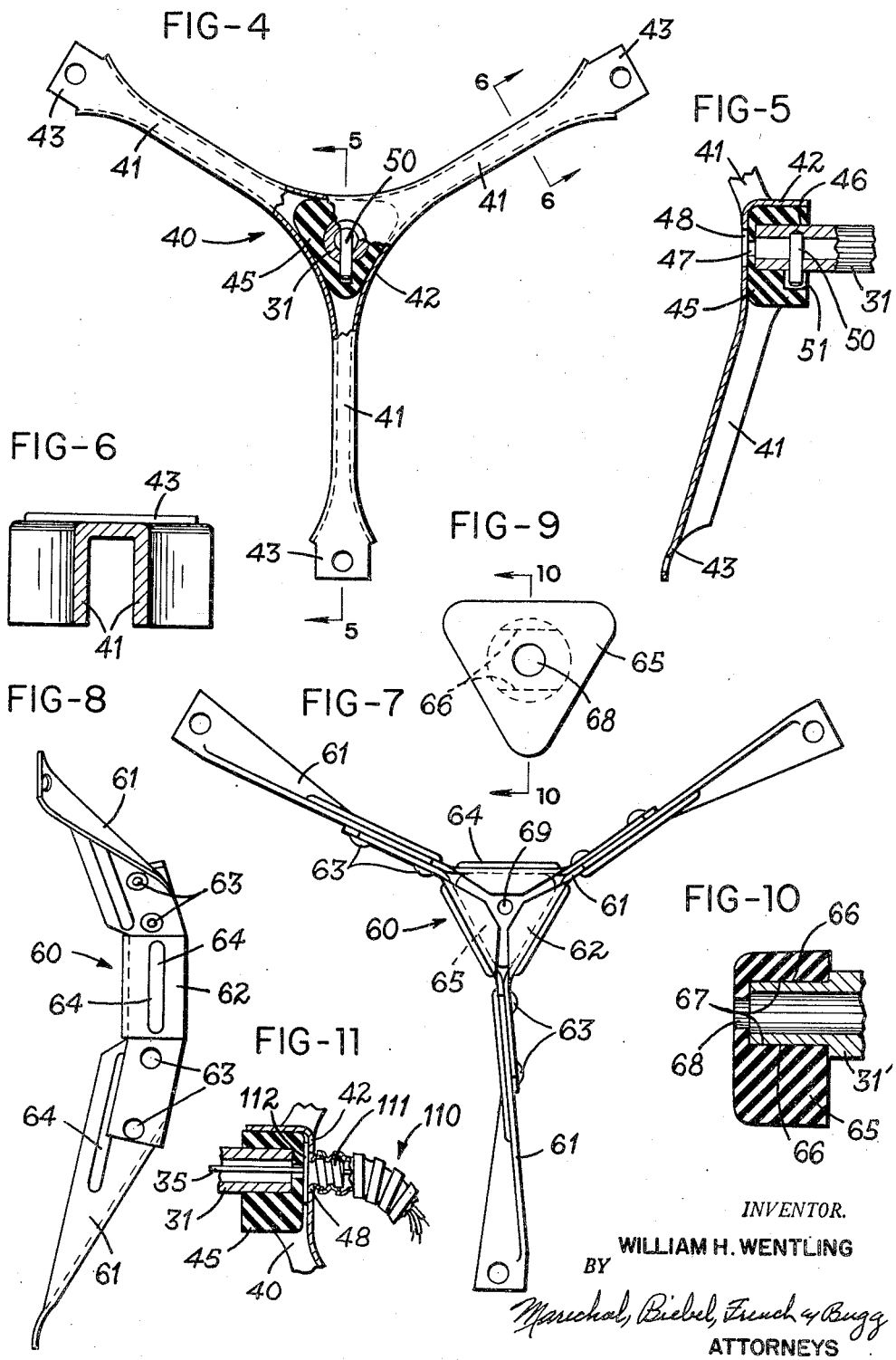

United States Patent Office 2,776,088
Patented Jan. 1, 1957

2,776,088

BLOWERS

William H. Wentling, Dayton, Ohio, assignor to The Lau Blower Company, Dayton, Ohio, a corporation of Ohio Application February 9, 1956, Serial No. 564,465

6 Claims. (Cl. 230—117)

This invention relates to centrifugal blowers.

The invention has special relation to a centrifugal blower having a drive motor which is enclosed within the blower wheel and has its parts reversed from the normal arrangement in that the rotor is annular and is mounted for rotation about its internally located stator. This arrangement has definite practical advantages from several standpoints including, for example, the fact that the cage structure of the blower wheel may be secured directly to the rotor with no intermediate gearing, belting, or other power transmission means. In addition, this arrangement provides for maximum compactness of construction since the motor is contained entirely within the outside dimensions of the blower housing and also can be arranged symmetrically for uniform distribution of the load requirements on the housing.

It is a primary object of the present invention to provide a centrifugal blower of the above outlined general characteristics which is constructed for simplicity and speed of assembly as well as the minimum number of component parts together with maximum assurance of safety and a long service life.

A further object of the invention is to provide a blower of the above type which is of such construction that the blower wheel and the entire motor can be assembled as a complete sub-assembly outside the housing for necessary tests such as balancing and can then be installed directly in a completed blower housing through the outlet of the housing and secured in operating position with minimum effort.

It is also an object of the invention to provide a centrifugal blower as outlined above incorporating a bracket structure for supporting the ends of the shaft whereon the motor stator is secured which is of simple construction facilitating assembly of the blower and which also establishes a positive mounting for the shaft to hold the shaft and the stator against possible rotation with respect to the housing.

Additional objects and advantages of the invention will be apparent from the following description, the accompanying drawings and the appended claims.

In the drawings:

Fig. 1 is a side elevation, partly broken away, showing a centrifugal blower constructed in accordance with the invention;

Fig. 2 is a view taken in section through the housing on the line 2—2 of Fig. 1 and with the blower wheel partially broken away;

Fig. 3 is a fragmentary view similar to Fig. 2 and showing a modified inlet construction in the blower housing;

Fig. 4 is an end elevational view, partly broken away, of one of the brackets which supports the blower wheel in the blower of Figs. 1 and 2;

Fig. 5 is a section on the line 5—5 of Fig. 3;

Fig. 6 is a section on the line 6—6 of Fig. 3 taken on a larger scale;

Fig. 7 is a view similar to Fig. 4 showing another form of mounting bracket in accordance with the invention;

Fig. 8 is a side elevational view of the bracket of Fig. 7 looking from right to left in Fig. 7;

Fig. 9 is an enlarged end elevational view of the rubber block or grommet supporting the shaft in the bracket of Fig.7;

Fig. 10 is a section on the line 10—10 of Fig. 9; and

Fig. 11 is a fragmentary section similar to Figs. 5 and 10 showing a protective mechanism for the leads to the motor of the blower.

Referring to the drawings, which illustrate preferred embodiments of the invention, the blower housing 10 in Figs. 1 and 2 is of the usual generally volute shape and includes a pair of opposed scroll sides 11 and 12 secured together in spaced relation by the scroll back 13. The housing 10 is shown as of the double inlet type, with each of the scroll sides including an annular flange portion 15 which is curved inwardly of the housing to define a venturi ring forming one of the inlets to the interior of the housing. The outlet 16 for the housing is provided between the ends of the scroll sides 11 and 12 for generally tangential discharge of air from the blower wheel within the housing. A removable baffle 17 is mounted within the housing across a portion of the outlet by means of screws 18.

The blower wheel within housing 10 is identified generally as 20, and it embodies a cage structure composed of a plurality of blower blades 21 secured together by means of a pair of center disks 22 and a pair of end rings 23. Suitable constructions for this cage unit are disclosed, for example in Carl E. Wilken Patent 2,537,805 and in the copending application of Carl E. Wilkin Serial No. 541,679, filed October 20, 1955, and assigned to the assignee of this application. The wheel 20 has an overall length slightly less than the spacing between the inlet flanges 15, as shown in Fig. 2, and its maximum diameter is slightly less than the height of the outlet 16 before the baffle 17 is installed.

The wheel 20 is mounted on and driven by a motor 25 which is mounted entirely within the interior of the wheel cage. More specifically, the motor 25 includes an annular rotor or armature 30 which is mounted for rotation directly on the shaft 31 by means of bearings 32. The stator 33 is received within the rotor 30, and it includes the necessary field windings and is keyed, pinned or otherwise positively secured to shaft 31 to prevent relative rotation thereof. The leads 35 to stator 33 are supplied thereto through the center of shaft 31, which is hollow for that purpose. The rotor 30 is secured directly to the wheel 20 by suitable bracket means shown as a lamination 36 of extra diameter secured to the center disks 22 by bolts and nuts 37.

As shown in Fig. 7, the shaft 31 is shorter than the axial spacing between the inlet flanges 15, and hence with the proportions of the outer parts as described, the entire blower wheel and motor can be assembled as a complete sub-assembly outside the housing and then inserted therein through the outlet 16. This is a definite advantage in manufacture since it eliminates the necessity for assembly operations on the wheel or motor within the housing after the wheel has been installed therein, and it also greatly simplifies operations such as balancing of the wheel assembly, which can be carried out before the wheel and motor sub-assembly is installed in the housing. At the same time, however, this arrangement calls for special means for mounting the blower wheel with respect to the housing, and the invention accordingly provides such means in the form of brackets and associated parts of special construction.

Referring to Figs. 1–5, each of the brackets 40 which support the ends of the shaft 31 is shown as formed from a single piece of sheet metal to provide three arms 41 radiating from a central structure 42 which defines an enclosure of generally triangular cup shape. The arms 41 are formed to a channel shape in section for increased rigidity, and they also are inclined away from the cup 42 so that when their outer ends 43 are mounted on the inlet flange 41, as by the screws 44, the cup 42 will project within the interior of the housing beyond the inlet flange 15. Thus as shown in Fig. 2, the two cups 42 are adapted to extend into the opposite ends of the wheel in overlapping relation with the ends of shaft 31.

The shaft 31 is in turn mounted in the bracket cups 42 by means of a pair of generally triangular blocks 45 of rubber material which form grommets proportioned for close fitting engagement within the cups 42. One face of each grommet, which forms the inner face, is provided with a bore 46 having a diameter sufficiently less than the outer diameter of shaft 31 to receive the end of the shaft tightly therein. A hole 47 of smaller diameter than bore 46 connects the latter with the outer face of the grommet 45 and matches a hole 48 through the center of bracket 40 to receive the leads 35 therethrough, and although only one of the brackets and grommets normally carries the leads, it is simpler to construct all of these parts alike.

As stated, the ends of the shaft 31 are force-fitted into the grommets 45, and the grommets are similarly forced into the cups 42, the latter operation being facilitated if the sides of the grommet are tapered slightly to diverge toward the inner surface thereof. This construction provides a secure mounting for the shaft in the brackets 40 to maintain the stator 33 stationary, and additionally a positive connection may be provided between the shaft and the bracket by means of a pin 50 set in the end of the shaft which does not carry the leads 35. This pin 50 is received initially in a groove 51 in the associated grommet 45, and the groove 51 extends in the direction of one corner of the grommet so that in the mounted position of the assembly, the pin 50 will lie within one of the channeled bracket arms 41. Thus even if the shaft 31 should work sufficiently loose in the grommet to start to turn, the pin 50 will abut the channeled wall of the bracket arm after only a few degrees of rotation of the shaft and will thus positively prevent further rotation thereof.

Figs. 7–9 show another construction of bracket 60 which is the functional equivalent of the bracket 40 but is fabricated from three bracket arms 61. These individual bracket arms are formed of generally V-shape from sheet metal so that when they are assembled as shown, they cooperate to define a cup-shaped enclosure 62 similar to the part 40, and they are secured together in this relation as by the rivets 63. Ribs 64 formed in the individual bracket arms provide increased rigidity for this bracket.

The grommet 65 in Figs. 8 and 9 is adapted for use in either of the brackets 40 and 60 and is similar to the grommet 45. In these views, however, the recess 66 which corresponds to bore 46 is provided with opposed flattened sides to receive the double flats 67 on the end of the shaft 31' for positive locking with the shaft, and the holes 68 and 69 correspond to holes 47 and 48. Thus the shaft is positively locked to the grommet, and the triangular shape of the grommet similarly provides positive locking to the bracket 60. The overall shape of the bracket is essentially the same as that of bracket 40 in its mounted position on the housing, with the outer portions of arms 61 being inclined away from the cup 62 to support the latter within the interior of the housing and the wheel to receive and support the ends of the shaft.

Both of these bracket constructions of Figs. 3–9 provide similar advantages in conjunction with the other features of the present invention. As stated, the housing and the wheel and motor sub-assembly can be completed separately except for mounting the brackets and the baffle 17 on the housing. The wheel unit is then inserted through the housing outlet 16 with the grommets 45 or 65 already mounted on the ends of the shaft. To complete the assembly of the blower, it is then merely necessary to fit a pair of brackets 40 or 60 over the grommets and to mount the brackets on the housing by means of the screws 44, after which the only remaining assembly operation is to install the baffle 17 within the housing outlet.

Fig. 3 shows a housing 100 of modified construction which may be used in installations where it is not convenient to assemble or remove the wheel unit through the housing outlet. In Fig. 3, the scroll side 101 is provided with an enlarged opening 102 of sufficiently greater diameter than the blower wheel 20 to permit the latter to be inserted axially therethrough. A separate venturi ring 105 forms the inlet through this scroll side and is secured directly thereto as by means of sheet metal screws 106. The bracket 40 is mounted directly on the venturi ring 105 in the same manner as in the construction shown in Figs. 1 and 2.

The opposite scroll side of the housing 100 may be the same as the scroll side 12 in Figs. 1 and 2, or it may be similar to the scroll side 102 and similarly provided with a removable venturi ring, although ordinarily only a single removable venturi ring will be needed. With this construction, the bracket at the other side of the housing may be mounted before the wheel is assembled into the housing, and then after the wheel has been inserted through the opening 102, the removable venturi ring, carrying its associated bracket, is mounted in place to complete the assembly.

Fig. 11 shows a convenient arrangement in accordance with the invention for protecting the leads 35 to the motor 25. The major protecting member for these leads is a flexible sheath 110 such for example as the outer sheath commonly used for BX cable and formed of a helically wound metal strip as shown. A thimble member 111 is mounted on the bracket 40 by projection through the opening 48 from the inside of the cup 42, the member 111 having a flange 112 which seats against the inside of the cup as shown. The projecting outer end of thimble 111 is formed with threads complementary to the helical construction of sheath 110 so that the latter may be threaded directly thereon, thus providing positive protection for the leads 35 while also facilitating bending of the leads and sheath as may be desired to maintain them out of the way.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A centrifugal blower of the character described comprising a housing of generally volute shape including opposed scroll sides, means defining a pair of aligned inlets through said scroll sides to the interior of said housing, a blower wheel within said housing including a cage structure having blower blades therein, means defining an outlet from said housing between the ends of said scroll sides and of greater cross sectional dimensions than said cage, an annular rotor received in and secured to said cage for rotation therewith, a stator received within said rotor in rotatable relation therewith, a shaft extending through and secured to said stator, said shaft being shorter in length than the spacing between said scroll sides to provide for assembly of said shaft with said stator and with said rotor and said cage as a complete sub-assembly through said outlet into the interior of said housing, and means for mounting said shaft in fixed relation on said housing to hold said stator stationary for rotation of said rotor and cage thereon.

2. A centrifugal blower of the character described comprising a housing of generally volute shape including opposed scroll sides, means defining a pair of aligned inlets through said scroll sides to the interior of said housing, a blower wheel within said housing including a cage structure having blower blades therein, means defining an outlet from said housing between the ends of said scroll sides and of greater cross sectional dimensions than said cage, an annular rotor received in and secured to said cage for rotation therewith, a stator received within said rotor in rotatable relation therewith, a shaft extending through and secured to said stator, said shaft being shorter in length than the spacing between said scroll sides to provide for assembly of said shaft with said stator and with said rotor and said cage as a complete sub-assembly through said outlet into the interior of said housing, a pair of brackets mounted on said scroll sides and extending inwardly of said housing through said inlets into overlapping relation with the ends of said shaft, and means for securing said shaft in fixed relation with said brackets to hold said stator stationary for rotation of said rotor and cage thereon.

3. A centrifugal blower of the character described comprising a housing of generally volute shape including opposed scroll sides, means defining a pair of aligned inlets through said scroll sides to the interior of said housing, a blower wheel within said housing including a cage structure having blower blades therein, means defining an outlet from said housing between the ends of said scroll sides and of greater cross sectional dimensions than said cage, an annular rotor received in and secured to said cage for rotation therewith, a stator received within said rotor in rotatable relation therewith, a shaft extending through and secured to said stator, said shaft being shorter in length than the spacing between said scroll sides to provide for assembly of said shaft with said stator and with said rotor and said cage as a complete sub-assembly through said outlet into the interior of said housing, a pair of brackets mounted on said scroll sides and extending inwardly of said housing through said inlets, each said bracket including a plurality of arms radiating from a center structure of generally cup shape facing inwardly of said housing and located in overlapping relation with the ends of said shaft, a block of rubber material received in each said center structure, and means cooperating with said blocks and said shaft to secure the ends of said shaft in fixed relation with said brackets to hold said stator stationary for rotation of said rotor and cage thereon.

4. A centrifugal blower of the character described comprising a housing of generally volute shape including opposed scroll sides, means defining a pair of aligned inlets through said scroll sides to the interior of said housing, a blower wheel within said housing including a cage structure having blower blades therein, means defining an outlet from said housing between the ends of said scroll sides and of greater cross sectional dimensions than said cage, an annular rotor received in and secured to said cage for rotation therewith, a stator received within said rotor in rotatable relation therewith, a shaft extending through and secured to said stator, said shaft being shorter in length than the spacing between said scroll sides to provide for assembly of said shaft with said stator and with said rotor and said cage as a complete sub-assembly through said outlet into the interior of said housing, a pair of brackets for supporting said shaft, each said bracket including a plurality of arms radiating from a center structure, means securing the outer ends of said arms to said scroll sides adjacent said inlets, each said center structure having side portions defining a cup-like enclosure facing inwardly of the adjacent said inlet, said arms being inclined with respect to said center structure to support said enclosures within said housing in overlapping relation with the ends of said shaft, a block of rubber material received in each said enclosure, and means coperating with said blocks and said shaft to secure the ends of said shaft in said blocks in fixed relation with said brackets to hold said stator stationary for rotation of said rotor and cage thereon.

5. A centrifugal blower of the character described comprising a housing of generally volute shape including opposed scroll sides, means defining a pair of aligned inlets through said scroll sides to the interior of said housing, a blower wheel within said housing including a cage structure having blower blades therein, means defining an outlet from said housing, and of greater cross sectional dimensions than said cage, an annular rotor received in and secured to said cage for rotation therewith, a stator received within said rotor in rotatable relation therewith, a shaft extending through and secured to said stator, a pair of brackets for supporting said shaft, each said bracket including a plurality of arms radiating from a center structure, means securing the outer ends of said arms to said scroll sides adjacent said inlets, each said center structure having side portions defining a generally triangular cup-like enclosure facing inwardly of the adjacent said inlet, a block of rubber material complementary in size and triangular shape to and received in each said enclosure, and means cooperating with said blocks and said shaft to secure the ends of said shaft in said blocks in fixed relation with said brackets to hold said stator stationary for rotation of said rotor and cage thereon.

6. A centrifugal blower of the character described comprising a housing of generally volute shape including opposed scroll sides, means defining a pair of aligned inlets through said scroll sides to the interior of said housing, a blower wheel within said housing including a cage structure having blower blades therein, means defining an outlet from said housing, an annular rotor received in and secured to said cage for rotation therewith, a stator received within said rotor in rotatable relation therewith, a hollow shaft extending through and secured to said stator, leads for said stator received within said hollow shaft and projecting from one end thereof, a pair of brackets for supporting said shaft, each said bracket including a plurality of arms radiating from a center structure, means securing the outer ends of said arms to said scroll sides adjacent said inlets, each said center structure having side portions defining a generally triangular cup-like enclosure facing inwardly of the adjacent said inlet, a block of rubber material complementary in size and triangular shape to and received in each said enclosure, means cooperating with said blocks and said shaft to secure the ends of said shaft in said blocks in fixed relation with said brackets to hold said stator stationary for rotation of said rotor and cage thereon, said bracket and said block at said one end of said shaft having holes therethrough aligned with said hollow shaft to receive said leads therethrough, a thimble member received through said hole in said bracket from the inner side thereof and projecting outwardly therefrom, said projecting portion of said thimble member having threads thereon, and a flexible sheath of helical construction for said leads threaded on said thimble and receiving said leads therethrough.

No references cited.